(12) United States Patent
Kawamura et al.

(10) Patent No.: US 12,476,256 B2
(45) Date of Patent: Nov. 18, 2025

(54) ELECTROLYTIC FOIL AND BATTERY CURRENT COLLECTOR

(71) Applicant: TOYO KOHAN CO., LTD., Tokyo (JP)

(72) Inventors: Michio Kawamura, Kudamatsu (JP); Shinichiro Horie, Kudamatsu (JP); Etsuro Tsutsumi, Kudamatsu (JP); Yuma Yoshizaki, Kudamatsu (JP); Koh Yoshioka, Kudamatsu (JP)

(73) Assignee: TOYO KOHAN CO., LTD., Tokyo (JP)

( * ) Notice: Subject to any disclaimer, the term of this patent is extended or adjusted under 35 U.S.C. 154(b) by 281 days.

(21) Appl. No.: 17/768,966

(22) PCT Filed: Sep. 29, 2020

(86) PCT No.: PCT/JP2020/036826
§ 371 (c)(1),
(2) Date: Apr. 14, 2022

(87) PCT Pub. No.: WO2021/075253
PCT Pub. Date: Apr. 22, 2021

(65) Prior Publication Data
US 2024/0105960 A1    Mar. 28, 2024

(30) Foreign Application Priority Data
Oct. 16, 2019    (JP) .................................. 2019-189800

(51) Int. Cl.
*H01M 4/66*    (2006.01)
*H01M 4/70*    (2006.01)

(52) U.S. Cl.
CPC ............. *H01M 4/662* (2013.01); *H01M 4/70* (2013.01)

(58) Field of Classification Search
CPC ................................ H01M 4/662; H01M 4/70
USPC ........................................................ 429/245
See application file for complete search history.

(56) References Cited

U.S. PATENT DOCUMENTS

2012/0202101 A1\* 8/2012 Ueda ..................... H01M 50/119
429/127

FOREIGN PATENT DOCUMENTS

| CN | 108807843 A | \* 11/2018 | |
|---|---|---|---|
| JP | 2005-197205 A | 7/2005 | |
| JP | 2016-9526 A | 1/2016 | |
| WO | WO-2012102220 A1 | \* 8/2012 | .......... H01M 2/1653 |

\* cited by examiner

*Primary Examiner* — Allison Bourke
*Assistant Examiner* — Robert Gene West
(74) *Attorney, Agent, or Firm* — FisherBroyles, LLP; Roger L. Browdy; James E. Mrose

(57) ABSTRACT

An electrolytic foil and a battery current collector is provided in which the risk of breakage or tearing during manufacturing presented by reduced thickness can be restrained, and which possess sufficient strength for repeated charging and discharging in a secondary battery. The electrolytic foil and the battery current collector contain a Ni—Fe alloy layer, having a thickness of 1.5 to 10 μm and having a first surface and a second surface and wherein the value of a three-dimensional surface properties parameter Sv divided by the thickness is equal to or less than 0.5 for the first surface and the second surface.

6 Claims, 3 Drawing Sheets

[Fig.2]
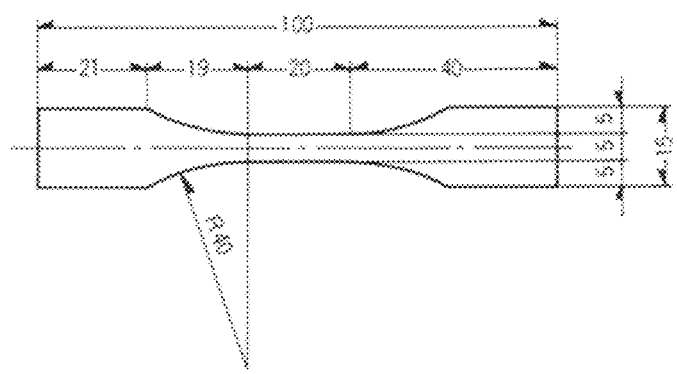

ELECTROLYTIC FOIL AND BATTERY CURRENT COLLECTOR

TECHNICAL FIELD

The present invention relates to an electrolytic foil used particularly suitably for a current collector of a secondary battery or the like, and a battery current collector.

BACKGROUND ART

For enhancing the capacity of a battery such as a lithium ion secondary battery or a nickel hydrogen battery conventionally used, a reduction in the thickness of the current collector is effective. However, when the thickness of the current collector is reduced, strength of the current collector would be lowered, generating the risk of deformation or breakage of the current collector.

In response to this problem, a technology for providing a thin electrolytic foil as a current collector has been disclosed.

For example, in PTL 1, a technology of subjecting at least one surface of an electrolytic foil including a metallic material low in ability to form a lithium compound to electroplating using a plating bath containing a nickel salt and an ammonium salt, to thereby form a hard nickel plating layer on the surface of the electrolytic foil, is proposed.

In addition, for example, in PTL 2, a technology in which nickel plating having little residual stress is applied to a copper foil used as a negative electrode current collector, to thereby restrain formation of a sulfide of copper and to provide a negative electrode current collector excellent in conductivity, is disclosed.

CITATION LIST

Patent Literature

[PTL 1]
Japanese Patent Laid-open No. 2005-197205
[PTL 2]
Japanese Patent Laid-open No. 2016-9526

SUMMARY

Technical Problems

However, in the technologies described in the aforementioned PTL 1 and PTL 2, although the strength of the current collector is enhanced to a certain extent, it can be said that room for improvement is still present at least in the following points.

The demand for battery performance in recent years has been enhanced, and thinning of the current collector itself permits an increase in the amount of an active material, and, therefore, such strength that breakage or tearing during manufacturing or handling due to the thinning of the current collector can be restrained has been desired.

Further, for example, in regard of a current collector for a negative electrode, having such high strength that the characteristics of a new active material such as a silicon-based or tin-based negative electrode material capable of substituting carbon can be followed up has come to be desired.

Further, a material which, when used as a current collector of a secondary battery, can restrain generation of wrinkles, breakage, tearing, or the like even when subjected to repeated charging and discharging and can restrain peeling off of an active material applied to the surface of the current collector has been desired.

Besides, in uses other than those in the current collector, for example, such uses as those in a heat radiating material or an electromagnetic wave shielding material, a thinned electrolytic foil having high strength have been desired.

However, PTL 1 and PTL 2 merely disclose a technical thought of providing a plurality of layers by use of a nickel film, and do not disclose a specific structure for realizing, at a high level, handleability during assembly of a battery or strength for repeated charging and discharging in a secondary battery.

The present invention has been made in consideration of the above-mentioned problems. It is an object of the present invention to provide an electrolytic foil and a battery current collector in which the risk of breakage or tearing during manufacturing presented by reduced thickness can be restrained and which have sufficient strength for repeated charging and discharging in a secondary battery.

Solution to Problems

An electrolytic foil of the present invention is (1) an electrolytic foil containing a Ni—Fe alloy layer, which is characterized by having a thickness of 1.5 to 10 µm, by having a first surface and a second surface and by that a value of a three-dimensional surface properties parameter Sv divided by the thickness is equal to or less than 0.5 for the first surface and the second surface.

In the electrolytic foil of (1) above, (2) the thickness is preferably 2.0 to 8.0 µm.

In addition, in the electrolytic foil of (1) or (2) above, (3) at least one metallic layer of a metallic species different from the Ni—Fe alloy layer is preferably laminated on the Ni—Fe alloy layer.

In the electrolytic foil of (3) above, (4) a thickness of the Ni—Fe alloy layer is preferably 2.0 to 9.9 µm.

In the electrolytic foil of (3) or (4) above, (5) a total thickness of the metallic layers is preferably 0.1 to 8.0 µm.

In the electrolytic foil of any one of (3) to (5) above, (6) a proportion of the thickness of the Ni—Fe alloy layer in the electrolytic foil is preferably 18% to 95%.

In the electrolytic foil of any one of (1) to (6) above, (7) tensile strength preferably exceeds 720 MPa.

Note that a battery current collector in the present invention (8) preferably includes the electrolytic foil described in any one of (1) to (7) above.

Advantageous Effects of Invention

According to the present invention, it is possible to provide an electrolytic foil capable of restraining breakage or tearing during handling, even when reduced in thickness. In addition, it is possible to provide an electrolytic foil and a battery current collector having sufficient strength for repeated charging and discharging, even when used as a current collector of a secondary battery.

BRIEF DESCRIPTION OF DRAWINGS

FIG. 2 is a schematic view depicting a specimen produced by use of the alloy electrolytic foil of the present embodiment.

DESCRIPTION OF EMBODIMENTS

«Alloy Electrolytic Foil 10»

An embodiment for carrying out an electrolytic foil of the present invention will be described below.

Figure 1A:
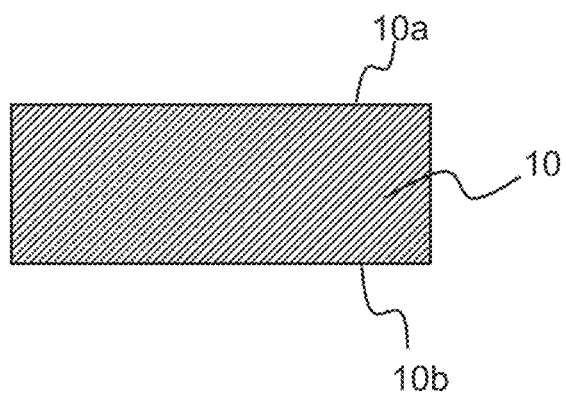
FIGS. 1A and 1B are schematic views depicting a section of an alloy electrolytic foil according to the present embodiment.
Figure 1B:
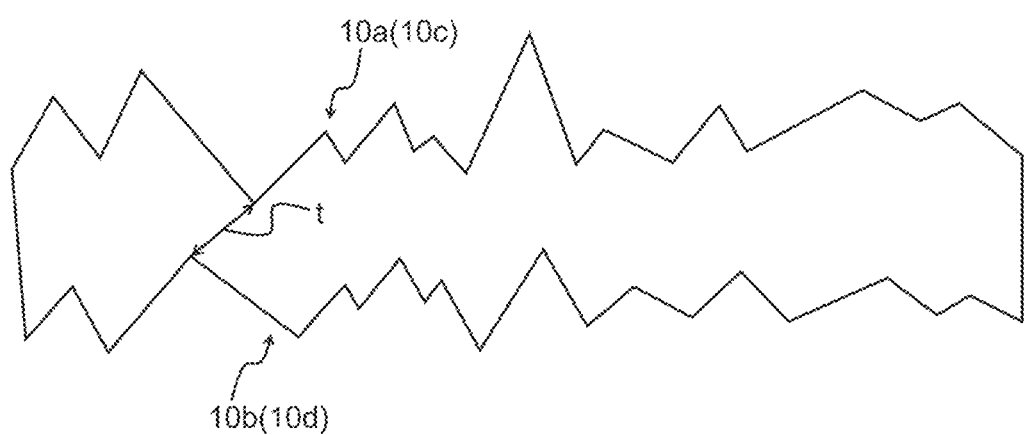

FIGS. 1A and 1B are diagrams schematically depicting an alloy electrolytic foil according to an embodiment of the electrolytic foil of the present invention. Note that the alloy electrolytic foil of the present embodiment is applied to a current collector of a battery negative electrode and can be applied also to a current collector of a battery positive electrode. The kind of the battery may be a secondary battery or a primary battery.

As depicted in FIGS. 1A and 1B, an alloy electrolytic foil 10 of the present embodiment has a first surface 10a and a second surface 10b. The alloy electrolytic foil 10 of the present embodiment includes a Ni—Fe alloy. In other words, the electrolytic foil of the present invention is characterized by containing the Ni—Fe alloy layer, and it can be said that the alloy electrolytic foil 10 of the present embodiment includes the Ni—Fe alloy layer as a whole.

Further, the alloy electrolytic foil 10 of the present embodiment is formed by electroplating. Specifically, the alloy electrolytic foil 10 can be formed by use of a known Ni—Fe alloy plating bath.

Note that, while the alloy electrolytic foil 10 of the present embodiment has the first surface and the second surface, the surface (substrate surface) having been in contact with a support (substrate) supporting the electrolytic foil at the time of manufacturing the alloy electrolytic foil 10 is the first surface 10a, and the surface (electrolytic surface) on the other side is the second surface 10b, in the following description.

As the proportion (wt %) of Ni and Fe in the Ni—Fe alloy of the alloy electrolytic foil 10 in the present embodiment, Ni:Fe is preferably 95:5 to 40:60. In this case, for enhancing the strength of the alloy electrolytic foil 10 as a whole, Ni:Fe is preferably 95:5 to 40:60, and more preferably 90:10 to 70:30.

On the other hand, in a case of giving priority to cost, Ni:Fe is preferably 80:20 to 50:50, and more preferably 70:30 to 53:47.

In the present embodiment, a Ni—Fe alloy plating layer to which a brightening agent is not added (for convenience, also referred to as "non-lustrous Ni—Fe alloy plating layer") may be adopted, or a lustrous Ni—Fe alloy plating layer to which a brightening agent (inclusive of a brightening agent for semi-luster) is added may be adopted.

Note that the aforementioned terms "lustrous" and "non-lustrous" depend on evaluation on a visual observation basis, and strict discrimination on a numerical value basis is difficult. Further, the extent of luster is variable depending on other parameters such as bath temperature which will be described later. Therefore, the terms "lustrous" and "non-lustrous" used in the present embodiment are defined in a case of paying attention to the presence or absence of a brightening agent.

The alloy electrolytic foil 10 of the present embodiment is characterized by having the first surface 10a and the second surface 10b, a three-dimensional surface properties parameter Sv divided by the thickness of the alloy electrolytic foil 10 being equal to or less than 0.5. The reason is as follows.

In response to a demand for thinning of an electrolytic foil used for a current collector, attendant on enhancement of capacity of a secondary battery, the alloy electrolytic foil 10 of the present embodiment is used to manufacture an alloy foil of high strength by electroplating in order to satisfy these demands.

The present inventors repeated extensive and intensive investigations for manufacturing an electrolytic foil in which the risk of breakage or tearing at the time of manufacturing and handling (inclusive of the time of assembly of a battery) can be restrained and, further, which can suppress wrinkling or breakage even in a case of using an active material large in volume change when charging and discharging of a secondary battery are repeated.

As a result, the present inventors have found out that the above effect can be obtained by controlling the surface shape in a case of using a Ni—Fe alloy electrolytic foil as an electrolytic foil of high strength, and have reached the present invention.

As a parameter expressing the surface shape of the Ni—Fe alloy electrolytic foil of the present embodiment, specifically, "maximum valley depth" (three-dimensional surface properties parameter Sv) of the surface roughness defined by ISO 25178-2:2012 is applied.

Theoretically, the tensile strength of a metallic foil is a value not influenced by the thickness. However, it was found out by the present inventors' research that, in practice, in a case where the thickness of the Ni—Fe alloy electrolytic foil is reduced (specifically, to a value equal to or less than 10 μm), the tensile strength may be extremely lower than the theoretical value. The present inventors thought that one of the reasons is that the tensile strength is liable to be influenced by ruggedness or the like of the metallic foil surface.

Particularly, it was found out that the original tensile strength of the Ni—Fe alloy electrolytic foil cannot possibly be obtained due to the generation of markedly deep recesses or valleys. It is assumed that, in a case of the Ni—Fe alloy which has a part where the distance t between the first surface 10a and the second surface 10b is particularly short, as depicted in FIG. 1B in the thickness direction of the electrolytic foil, a crack generated by concentration of stress in the part would become a crack propagated to the whole body of the alloy layer starting from the part, in the highly hard Ni—Fe. As a result, it is considered that breakage or tearing is liable to be easily generated as compared to other metallic species, and only strength lower than the original strength can be obtained. In addition, it was also found out that this phenomenon is liable to be generated more particularly in the electrolytic foil equal to or less than 8.0 μm. Note that it was confirmed that strength of Ni is not particularly varied even in a case of reducing the thickness.

As a result of repeated investigations based on the aforementioned assumption, by setting the Sv (maximum valley depth) at a predetermined value in relation with the thickness of the electrolytic foil, in the surface of the Ni—Fe alloy electrolytic foil of the present embodiment, an alloy electrolytic foil having high tensile strength not seen in the conventional technology can be obtained.

The alloy electrolytic foil 10 of the present embodiment based on the aforementioned gist is characterized by having the value of "Sv (maximum valley depth) [μm]/the thickness [μm] of the alloy electrolytic foil 10" for the surface (the first surface 10a and the second surface 10b) equal to or less than 0.5.

In a case where the value of Sv (maximum valley depth)/the thickness of the alloy electrolytic foil 10 exceeds 0.5, it may be impossible to obtain a necessary value in tensile strength of the alloy electrolytic foil, which is unfavorable. From the viewpoint of stabilizing the strength more (being liable to maintain the original strength), the value is preferably equal to or less than 0.48, and more preferably equal to or less than 0.46.

Note that the three-dimensional surface properties parameter Sv in the alloy electrolytic foil 10 of the present embodiment can be determined by a known non-contact-type three-dimensional surface roughness measuring device or the like.

Note that, in the alloy electrolytic foil 10 of the present embodiment, values of Sku (the extent of sharpness of histogram of height distribution), Sv [μm] (maximum valley depth), Sz [μm] (maximum height), and Sa [μm] (arithmetic mean height) for the first surface 10*a* and the second surface 10*b* preferably have the following values.

Sku . . . less than 7.2, more preferably equal to or less than 6.0

Sv . . . less than 2.2, more preferably equal to or less than 2.0

Sz . . . less than 4.7, more preferably equal to or less than 4.0

Sa . . . less than 0.3, more preferably equal to or less than 0.25

Note that, in order to control the three-dimensional surface properties parameters Sku, Sv, Sz, and Sa in the alloy electrolytic foil 10 of the present embodiment, a method of controlling the plating conditions, a method of polishing the surface of the support, a method of smoothing the surface of the obtained alloy electrolytic foil by an etching treatment, electrolytic polishing, or the like, and the like can be mentioned as described later.

Next, the thickness of the alloy electrolytic foil 10 in the present embodiment will be described.

The thickness of the alloy electrolytic foil 10 in the present embodiment is characterized in that the thickness is 1.5 to 10 μm. The thickness is more preferably 2.0 to 8.0 μm, and particularly preferably 2.5 to 6.0 μm. If the thickness exceeds 10 μm, in the first place, it does not conform to design thought from the background intending an increase in capacity by thinning, and further a cost-based advantage as compared to a known rolled foil or the like is reduced. On the other hand, a thickness less than 1.5 μm makes it difficult to secure sufficient strength against influences of charging and discharging, and the risk of breakage, tearing, wrinkling, or the like at the time of manufacturing or handling of the battery would be increased.

Note that "the thickness of the alloy electrolytic foil 10" in the present embodiment is preferably measurement of thickness by a gravimetric method. Alternatively, measurement of thickness by a micrometer may also be applied. However, it is to be noted that, in a case where Sz exceeds 4.0 μm, the thickness measured by a micrometer may be highly possibly a different value, under the influence of the ruggedness of the surface, so that the gravimetric method is desirable.

Note that, in a case where the Ni layer is laminated in a laminated electrolytic foil A described later, the gravimetric method makes it difficult to specify the density and the film thickness, so that measurement of the thickness by a micrometer is preferable.

Note that the tensile strength of the Ni—Fe alloy electrolytic foil 10 of the present embodiment is preferably a value exceeding 720 MPa. If the tensile strength of the Ni—Fe alloy electrolytic foil 10 is equal to or less than 720 MPa, tearing or breakage of the foil at the time of manufacturing the battery may possibly be generated, and handleability is lowered, which is unfavorable. In addition, in a case of application to the current collector of a secondary battery, it may be impossible to follow up volume increase due to repetition of charging and discharging, and breakage may occur, which is unfavorable.

In the present embodiment, tensile strength equal to or more than 1,000 MPa can be achieved even when the thickness of the alloy electrolytic foil 10 is equal to or less than 4 μm.

Note that the tensile strength of the alloy electrolytic foil in the present embodiment can be measured, for example, in the following manner. By an SD-type lever-type specimen cutter (model: SDL-200) made by DUMBBELL CO., LTD., a dumbbell No. 4 metallic piece of JIS K6251 depicted in FIG. 2 is die-cut by use of a cutter (model: SDK-400) according to JIS K6251. Then, by use of this specimen, a tensile test can be conducted according to a tensile test method according to JIS Z 2241 which is a JIS standard for a metallic specimen.

Note that the size of crystal grains (crystal grain diameter) in the Ni—Fe alloy electrolytic foil 10 of the present embodiment is not particularly limited to any size insofar as the value of the aforementioned "Sv (maximum valley depth) [μm]/the thickness [μm] of the alloy electrolytic foil 10" is equal to or less than 0.5, but is preferably, for example, 0.01 to 1 μm. Note that the crystal grain diameter can be determined by use of a cutting method by section observation or crystal orientation analysis of electron back-scatter diffraction (EBSD).

Note that, when the Ni—Fe alloy electrolytic foil 10 of the present embodiment is manufactured, a Ni—Fe alloy plating is formed on a support including a titanium plate or stainless steel plate or the like, after which the plating layer is peeled off from the support by a known method, whereby the Ni—Fe alloy electrolytic foil 10 can be obtained.

Note that a specific material of the support is not limited to the aforementioned titanium plate or stainless steel plate, but other known metallic materials can be applied insofar as the other known metallic materials do not depart from the gist of the present invention.

As the Ni—Fe alloy plating bath, the following conditions may be mentioned.

[Ni—Fe Alloy Plating Conditions]

Bath composition

Nickel sulfate hexahydrate: 150 to 250 g/L

Iron sulfate heptahydrate: 5 to 100 g/L

Nickel chloride hexahydrate: 20 to 50 g/L

Boric acid: 20 to 50 g/L

Sodium citrate (or trisodium citrate): 1 to 15 g/L

Sodium saccharin: 1 to 10 g/L

Temperature: 25° C. to 70° C.

pH: 2 to 4

Stirring: air stirring or jet stirring

Current density: 5 to 40 A/dm$^2$

Note that, in a case where the bath temperature is less than 25° C., the roughness of the foil becomes conspicuous, which is unfavorable. In addition, it may be possible that the layer cannot be precipitated, which is unfavorable. On the other hand, even in a case where the bath temperature exceeds 70° C., the roughness of the foil becomes conspicuous, which is unfavorable. Besides, the tensile strength of the layer obtained cannot be secured, which is unfavorable.

In a case where pH is less than 2, the roughness of the foil becomes conspicuous, which is unfavorable. In addition, precipitation efficiency of plating is lowered, which is unfavorable. On the other hand, when pH exceeds 4, the roughness of the foil would become high, which is unfavorable. Besides, it is possible that sludge is taken in the layer obtained, which is unfavorable.

In a case where current density is less than 5 A/dm$^2$, the roughness of the foil would become conspicuous, which is unfavorable. In addition, production efficiency may be lowered, which is unfavorable. In a case where the current density exceeds 40 A/dm$^2$, plating burning may be generated, which is unfavorable.

Besides, an appropriate amount of an anti-pitting agent may be added.

As a method of manufacturing the Ni—Fe alloy electrolytic foil 10 of the present embodiment, generally, the following steps may be mentioned.

First, a support to be formed with a plating layer is subjected to pretreatments such as polishing, wiping, water washing, degreasing, and pickling, after which the support is immersed in the plating bath exemplified above, to form a Ni—Fe alloy plating layer on the support. After the thus formed plating layer is dried, the plating layer is peeled off to obtain the Ni—Fe alloy electrolytic foil 10.

In the aforementioned steps, the polishing of the pretreatments applied to the support will be described. When the Ni—Fe alloy electrolytic foil 10 of the present embodiment is manufactured, the surface shape of the support to be formed with the plating layer is generally transferred to the plating layer to become a surface (substrate surface) on one side of the alloy electrolytic foil 10. In addition, the shape of a surface (electrolytic surface) of the alloy electrolytic foil 10 more possibly reflects the surface shape of the support, as the thickness of the alloy electrolytic foil 10 is smaller.

Therefore, in order to set the value of the three-dimensional surface properties parameter Sv of the Ni—Fe alloy electrolytic foil 10 into the aforementioned range, it is preferable to control the surface shape of the support, and, for example, it is preferable to control the surface roughness Sa. Specifically, the surface roughness Sa of the support is preferably equal to or less than 0.14 µm.

Setting the surface roughness Sa of the support to the above-mentioned value can be achieved, for example, by polishing the surface of the support by use of known means. Here, the polishing direction is not particularly limited to any direction, and polishing may be conducted in a specific direction such as the width direction or longitudinal direction of the support, or polishing may be conducted at random.

Before or after peeling off of the Ni—Fe alloy electrolytic foil 10 from the support, a roughening treatment, a rust-proofing treatment, or the like in the range defined by claims of the present invention may be applied to the outermost surface of the Ni—Fe alloy electrolytic foil 10. Alternatively, a known treatment for imparting conductivity, such as carbon coating, may be applied.

Note that, in the present embodiment, as the method of controlling the surface roughness (three-dimensional surface properties) of the Ni—Fe alloy electrolytic foil 10, a method of controlling the plating conditions as described above and a method of polishing the surface of the support have been mentioned, but these methods are not limitative. For example, by a method of smoothing the surface of the Ni—Fe alloy electrolytic foil 10 itself by an etching treatment, electrolytic polishing, or the like, the desired three-dimensional surface properties can be obtained.

Note that, in the present embodiment, an example in which the Ni—Fe alloy is carried out by continuous manufacture (for example, drum system or roll-to-roll system) using the support has been described, but the present invention is not limited to this mode, and, for example, batch-type manufacture using a cut plate may also be possible.

In addition, since the alloy electrolytic foil of the present embodiment has the aforementioned configuration, the following advantageous effects are produced. In the step of manufacturing the metallic foil as a current collector, the drying temperature may reach a temperature equal to or higher than 200° C. (equal to or lower than 400° C.). Since the Ni—Fe alloy electrolytic foil in the present embodiment maintain certain strength even in the aforementioned heating temperature band, lowering in the strength in heating at the time of manufacturing or handling (battery assembly time or when used as a current collector) can be restrained.

«Laminated Electrolytic Foil A»

Next, as another embodiment of the present invention, a laminated electrolytic foil A will be described.

Figure 3A:
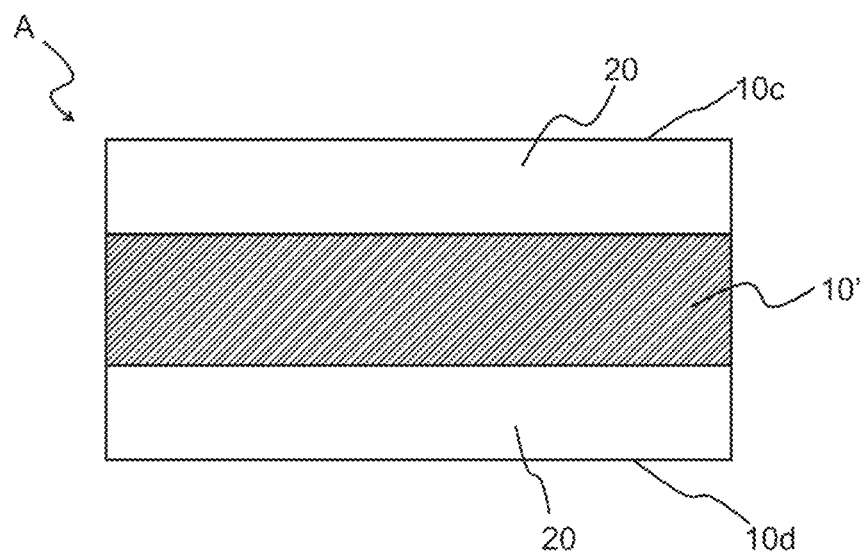
FIGS. 3A and 3B are schematic views depicting a laminated electrolytic foil according to the present embodiment.
Figure 3B:
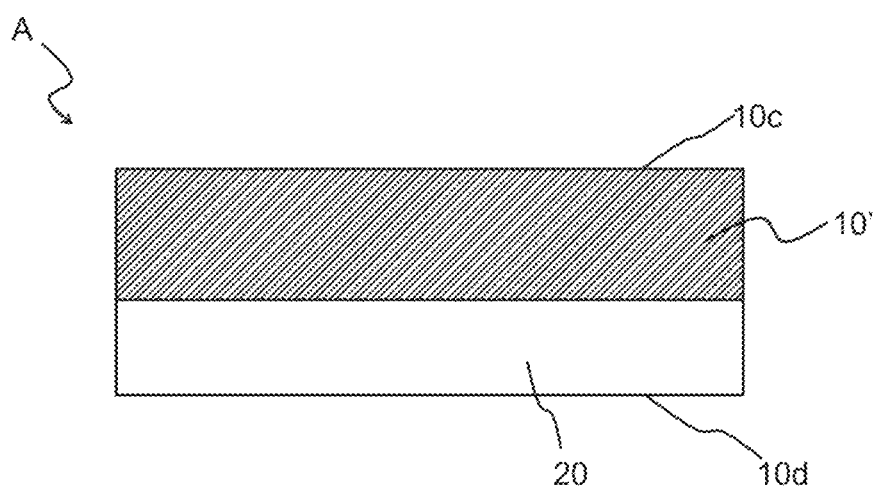

As depicted in FIGS. 3A and 3B, the laminated electrolytic foil A in the present embodiment has a Ni—Fe alloy electrolytic layer 10' and at least one metallic later 20 of a different metallic species from the Ni—Fe alloy electrolytic layer 10'. In other words, in the present embodiment, it is preferable that the metallic layer 20 be laminated on either surface or both surfaces of the Ni—Fe alloy electrolytic layer 10'. As the kind of the metallic layer 20, there can be mentioned Cu, Ni, Co, Fe, and the like.

Since these metals are metals which do not react with Li at an operating potential of a negative electrode of a lithium ion secondary battery, they can be suitably used as a lithium ion secondary battery current collector electrolytic foil.

As advantages in a case where Cu is used as the metallic layer 20, there can be mentioned that Cu is widely used as an existing lithium ion secondary battery material, that Cu is high in reliability as a lithium ion secondary battery negative electrode current collector material, that Cu is superior in electroconductivity, and the like.

In addition, as an advantage in a case where Ni is used as the metallic layer 20, there can be mentioned that Ni is excellent in sulfur resistance and strength.

Further, as depicted in FIGS. 3A and 3B, the laminated electrolytic foil A has a first surface 10c and a second surface 10d. In both the first surface 10c and the second surface 10d, one such characteristic is that the value of a three-dimensional surface properties parameter Sv divided by the thickness of the laminated electrolytic foil A is equal to or less than 0.5.

In other words, the laminated electrolytic foil A of the present embodiment includes the Ni—Fe alloy electrolytic layer 10' and the metallic layer 20 of a metallic species different from the Ni—Fe alloy electrolytic layer 10'. By these metallic species, the conductivity, the sulfur resistance, the strength, and the like as a whole body of the laminated electrolytic foil can be adjusted, and the laminated electrolytic foil as a lithium ion secondary battery negative electrode current collector material having a desired property can be manufactured.

In the present embodiment, one such characteristic is that the thickness of the laminated electrolytic foil A as a whole is equal to or less than 10 µm. In a case where the laminated electrolytic foil A has a thickness exceeding 10 µm, like the case of the alloy electrolytic foil, it does not conform to the design thought from the background intending enhancement of capacity by thinning, and, further, a cost-based advantage as compared to a known rolled foil and the like would be reduced. Note that the lower limit for the thickness of the laminated electrolytic foil A as a whole is not particularly limited to any value, but the lower limit is more preferably equal to or more than 2 µm from the viewpoint of restraining generation of breakage or wrinkling at the time of manufacturing a battery.

Note that the metallic layer 20 in the laminated electrolytic foil A may be formed on both sides of the Ni—Fe alloy electrolytic layer 10', as depicted in FIG. 3A, or may be formed on only one side, as depicted in FIG. 3B. In addition, the thickness of the metallic layer 20 may be even on both sides of the Ni—Fe alloy electrolytic layer 10', or may be different.

The thickness of the metallic layer 20 in the laminated electrolytic foil A is preferably 0.1 to 8.0 µm, in total. On the other hand, the thickness of the Ni—Fe alloy electrolytic layer 10' in the laminated electrolytic foil A is preferably 2.0 to 9.9 µm.

In addition, the proportion of the thickness of the Ni—Fe alloy electrolytic layer 10' in the laminated electrolytic foil A is preferably 18% to 95%, and more preferably 35% to 90%. Particularly, in a case where the thickness of the laminated electrolytic foil A as a whole is equal to or less than 8.0 µm, the proportion of the thickness of the Ni—Fe alloy electrolytic layer 10' is preferably equal to or more than 40%, and more preferably equal to or more than 48%.

In the present embodiment, as "the thickness of the laminated electrolytic foil A," thickness measurement by the gravimetric method is suitable, like in a case of "the thickness of the alloy electrolytic foil 10." Besides, thickness measurement by a micrometer may also be applied. It is to be noted, however, in a case of laminating a Ni layer as the metallic layer 20, it is difficult to specify the density and film thickness by the gravimetric method, so that thickness measurement by a micrometer is preferable.

As for the metallic layer or layers 20, the metallic species formed on the first surface 10c of the Ni—Fe alloy electrolytic layer 10' and the metallic species formed on the second surface 10d may be the same metal or may be different metals.

In manufacturing the laminated electrolytic foil A, on the support including a titanium plate, a stainless steel plate, or the like, the metallic layer 20, the Ni—Fe alloy electrolytic layer 10' and the metallic layer 20 are sequentially laminated by plating, after which the plating layer (laminated electrolytic foil A) as a whole is peeled off from the support, whereby the laminated electrolytic foil A is obtained. Alternatively, the metallic layer 20 and the Ni—Fe alloy electrolytic layer 10' may be sequentially laminated on the support by plating, after which the plating layer (laminated electrolytic foil A) as a whole may be peeled off from the support, whereby the laminated electrolytic foil A may be obtained. Alternatively, the Ni—Fe allot electrolytic layer 10' and the metallic layer 20 may be sequentially laminated on the support by plating, after which the plating layer (laminated electrolytic foil A) as a whole may be peeled off from the support, whereby the laminated electrolytic foil A may be obtained.

Note that the laminated electrolytic foil A is not limited to the three-layer structure, but, insofar as it includes the Ni—Fe alloy electrolytic layer 10', it may have, for example, a four-layer structure or a five-layer structure or a laminated electrolytic foil having more layers.

However, from the viewpoint of cost or easiness of production, it is suitable that the laminated electrolytic foil has a configuration of "Cu/Ni—Fe alloy/Cu" or "Ni/Ni—Fe alloy/Ni" or the like.

Note that the three-dimensional surface properties parameter Sv in the laminated electrolytic foil A of the present embodiment can be determined by a known non-contact-type three-dimensional surface roughness measuring device or the like.

Note that, in the laminated electrolytic foil A of the present embodiment, values of Sku (extent of sharpness of the histogram of height distribution) in the first surface 10c and the second surface 10d, Sv [µm] (maximum valley depth), Sz [µm] (maximum height), and Sa [µm] (arithmetic mean height) preferably have the following values.

Sku . . . less than 7.2, more preferably equal to or less than 6.0

Sv . . . less than 2.2, more preferably equal to or less than 2.0

Sz . . . less than 4.7, more preferably equal to or less than 4.0

Sa . . . less than 0.3, more preferably equal to or less than 0.25

Note that, in order to control the three-dimensional surface properties parameters Sku, Sv, Sz, and Sa in the laminated electrolytic foil A of the present embodiment to be kept within the above ranges, there can be mentioned a method of controlling the plating conditions as described later, a method of polishing the surface of the support, a method of smoothing the surface of the obtained alloy electrolytic foil by an etching treatment or electrolytic polishing or the like, and the like.

Next, as a method of manufacturing the laminated electrolytic foil A of the present embodiment, there can be mentioned, for example, the following methods.

First, the support to be formed with the plating layer is subjected to pretreatments such as polishing, wiping, water washing, degreasing, and pickling, after which the support is immersed in a plating bath, to form a plating layer for forming the metallic layer 20 on the support. Next, the support is sequentially immersed in a plating bath for forming the Ni—Fe alloy electrolytic layer 10' thereon and, further, a plating bath for forming the metallic layer 20. After the thus formed plating layers are dried, the plating layers as a whole is peeled off from the support, whereby the laminated electrolytic foil A can be obtained.

Note that, as for the surface roughness Sa of the support, like in the case of manufacturing the aforementioned Ni—Fe alloy electrolytic layer 10', the surface roughness Sa is preferably equal to or less than 0.14 µm.

In addition, before or after peeling off of the laminated electrolytic foil A from the support, as long as the value of the three-dimensional surface properties parameter Sv divided by the thickness is equal to or less than 0.5, the outermost surface of the laminated electrolytic foil A may be subjected to a roughening treatment or a rustproofing treatment within a range defined by the claims of the present invention. Alternatively, a known treatment for imparting conductivity, such as carbon coating, may be applied.

Note that, as a method of controlling the surface roughness (three-dimensional surface properties) of the laminated electrolytic foil A of the present embodiment, like in a case of the aforementioned alloy electrolytic foil, a method of controlling the plating conditions or a method of polishing the surface of the support can be adopted, and a method of smoothing the surface of the laminated electrolytic foil A itself by an etching treatment, electrolytic polishing, or the like may be adopted, whereby the desired three-dimensional surface properties can be obtained.

In a case where the metallic layer 20 is a non-lustrous Cu plating layer, an example of plating conditions is as follows.

[Non-Lustrous Cu Plating Conditions]
    Bath composition: a known copper sulfate bath containing copper sulfate as a main constituent (an example is set forth below)
        Copper sulfate pentahydrate: 150 to 250 g/L
        Sulfuric acid: 30 to 60 g/L
        Hydrochloric acid (as 35%): 0.1 to 0.5 ml/L
    Temperature: 25° C. to 70° C.
    pH: equal to or less than 1
    Stirring: air stirring or jet stirring
    Current density: 1 to 30 A/dm$^2$ Note that a preferable relation between the bath temperature and the current density is as follows.

First, in a case where the bath temperature is 25° C. to 70° C., the current density is preferably equal to or more than 1 A/dm$^2$. In this case, if the current density is less than 1 A/dm$^2$, the obtained Cu layer has a high surface roughness of the precipitated surface, or it is difficult to obtain sufficient tensile strength.

In a case where the bath temperature is equal to or less than 25° C., even if the current density is in the appropriate range of 5 to 40 A/dm$^2$, the precipitation efficiency of plating is lowered, or it is difficult to obtain sufficient tensile strength in the obtained Cu layer, which is unfavorable.

On the other hand, in a case where the bath temperature exceeds 70° C., even if the current density is in the appropriate range of 5 to 40 A/dm$^2$, the obtained Cu layer has a high surface roughness of the precipitated surface, or it is difficult to obtain sufficient tensile strength, which is unfavorable.

Note that, in a case where pH exceeds 1, the obtained Cu layer has a high surface roughness, or it is difficult to obtain sufficient tensile strength, which is unfavorable.

Note that, in a case where 1 to 20 ml/L of a brightening agent is added to the non-lustrous Cu plating bath, a lustrous Cu plating bath can be obtained. As the brightening agent in the lustrous Cu plating, a known brightening agent is used, without being limited to any particular kind. Examples include organic sulfur compounds such as saccharin and sodium naphthalenesulfonate, aliphatic unsaturated alcohols such as polyoxy-ethylene adduct, unsaturated carboxylic acids, formaldehyde, and coumarin.

In addition, in a case where the metallic layer 20 is a non-lustrous Ni plating layer, an example of plating conditions is as follows. As the non-lustrous Ni plating conditions, a known Watts bath which follows or a sulfamic acid bath can be used.

[Non-Lustrous Ni Plating (Watts Bath) Conditions]
    Bath composition: known Watts bath (an example is set forth below)
        Nickel sulfate hexahydrate: 200 to 350 g/L
        Nickel chloride hexahydrate: 20 to 50 g/L
        Boric acid (or citric acid): 20 to 50 g/L
    Temperature: 25° C. to 70° C. (preferably 30° C. to 40° C.)
    pH: 3 to 5
    Stirring: air stirring or jet stirring
    Current density: 1 to 40 A/dm$^2$ (preferably 8 to 20 A/dm$^2$)

Note that a preferable relation between the bath temperature and the current density is as follows.

First, in a case where the bath temperature is 25° C. to 45° C., it is preferable that the current density be 5 to 20 A/dm$^2$, since tensile strength of the Ni layer can be enhanced. In this case, if the current density exceeds 20 A/dm$^2$, there arises a problem that the Ni plating film is not formed. On the other hand, if the current density is less than 5 A/dm$^2$, the obtained Ni layer has a high surface roughness of the precipitated surface, whereby the possibility of breakage of the foil is increased, or it is difficult to obtain sufficient strength.

In a case where the bath temperature exceeds 45° C. and is equal to or less than 70° C., it is preferable that the current density be 3 to 10 A/dm$^2$ because tensile strength of the Ni layer can be enhanced, and it is more preferable that the current density is 3 to 6 A/dm$^2$ for the same reason as mentioned above. If the current density is less than 3 A/dm$^2$, the obtained Ni layer has a high surface roughness of the precipitated surface, whereby the possibility of breakage of the foil is increased, or productivity is extremely lowered, which is unfavorable. On the other hand, if the current density exceeds 10 A/dm$^2$, it may be difficult to obtain strength of the formed Ni layer.

In addition, in a case where pH is less than 3, precipitation efficiency of plating is lowered, which is unfavorable. On the other hand, if pH exceeds 5, sludge is possibly taken in the layer obtained, which is unfavorable.

Note that, in a case where 0.1 to 20 ml/L of a brightening agent is added to the non-lustrous Ni plating bath, a lustrous Ni plating bath is obtained. As the brightening agent in the lustrous Ni plating, a known brightening agent is used, without being limited to any particular kind. Examples include organic sulfur compounds such as saccharin and sodium naphthalenesulfonate, aliphatic unsaturated alcohols such as polyoxy-ethylene adduct, unsaturated carboxylic acids, formaldehyde, and coumarin. Besides, an appropriate amount of an anti-pitting agent may be added to the non-lustrous Ni plating bath or a bath to which the brightening agent has been added.

In a case of lustrous Ni plating, plating conditions preferably include bath temperature of 30° C. to 60° C. and a current density of 5 to 40 A/dm$^2$. The reason for this is the same as that in a case of the non-lustrous Ni plating bath.

[Non-Lustrous Ni Plating (Sulfamic Acid Bath) Conditions]
    Bath composition: a known nickel sulfamate plating bath (an example is set forth below)
        Nickel sulfamate: 150 to 300 g/L
        Nickel chloride hexahydrate: 1 to 10 g/L
        Boric acid: 5 to 40 g/L
    Temperature: 25° C. to 70° C.
    pH: 3 to 5
    Stirring: air stirring or jet stirring
    Current density: 5 to 30 A/dm$^2$ Besides, the aforementioned known brightening agent or the like may be added to the plating bath, to realize lustrous Ni plating or semi-lustrous Ni plating. In addition, an appropriate amount of an anti-pitting agent may be added.

Note that an example of manufacturing the laminated electrolytic foil A by a system of continuous manufacture by use of the support (for example, drum system or roll-to-roll system) has been described in the present embodiment, but the present invention is not limited to this mode, and a batch type manufacture using, for example, a cut plate can also be adopted. In addition, the method of manufacturing the Ni—Fe alloy electrolytic layer 10' in the laminated electrolytic foil A of the present embodiment is similar to that for the aforementioned Ni—Fe alloy electrolytic foil 10, and, therefore, detailed description thereof is omitted here.

EXAMPLES

The present invention will be more specifically described below with Examples. Note that the thickness described in Examples is a target value, and actually measured values of the thickness (total thickness) are set forth in tables.

First, measuring methods in Examples will be described.
[Measurement of Tensile Strength]

For the alloy electrolytic foil or laminated electrolytic foil obtained, measurement of tensile strength was conducted as follows. First, by an SD type lever sample cutter (Model: SDL-200) made by DUMBBELL CO., LTD., die-cutting of a metallic piece was performed by use of a cutter (Model: SDK-400) according to JIS K6251-4. Next, this specimen was subjected to tensile test according to a tensile test method according to JIS Z 2241 which is a JIS standard for metallic specimens. A schematic view of the specimen is depicted in FIG. 2.

Note that mechanical strength (tensile strength) was measured by a tensile test using a tensile tester (universal material testing machine TENSILON RTC-1350A, made by ORIENTEC CORPORATION) as a device for the tensile test. In addition, the measurement conditions included room temperature and a tensile speed of 10 ram/min.

[Measurement of Thickness]

In regard of the alloy electrolytic foil or laminated electrolytic foil obtained, in Examples 1 to 17 and Comparative Examples, the measurement of thickness was conducted by the gravimetric method, and, in Examples 18 to 25, the measurement of thickness was performed by a micrometer.

The thickness measuring method by the gravimetric method is as follows. The alloy electrolytic foil obtained was die-cut to be φ49 mm. The alloy electrolytic foil thus die-cut was quantitatively determined by use of an ICP emission spectrophotometer ICPE-9000 made by SHIMADZU CORPORATION, to measure the weights of various metals per unit area, and the weights were compared with the respective densities of the metals, thereby calculating the film thicknesses.

Note that the layer configuration of the laminated electrolytic foil was confirmed by a section image.

[Measurement of Surface Shape]

In the alloy electrolytic foil or laminated electrolytic foil obtained, the surface having been in contact with the support (substrate surface) is denoted by 10a, whereas the surface on the other side (electrolytic surface) is denoted by 10b, and the surface shapes of the respective surfaces were measured. Specifically, by use of a laser microscope OLS5000 made by Olympus Corporation, values of Sku (extent of sharpness of the histogram of height distribution), Sv [μm] (maximum valley depth), Sz [μm] (maximum height), and Sa [μm] (arithmetic mean height) were measured. Then, Sv [μm]/total thickness [μm] was calculated, the results being set forth in Table 2.

Example 1

A Ni—Fe alloy plating was formed on a support. Specifically, first, a Ti material was used as the support on an upper surface of which an alloy electrolytic foil is to be formed, the surface of the Ti material was polished, so that the surface roughness Sa of the Ti material became the values set forth in Table 1. The direction of polishing was substantially parallel to the longitudinal direction (progressing direction at the time of continuous manufacture; longitudinal direction) of the Ti material. The Ti material was subjected to known pretreatments such as pickling using 7 wt % sulfuric acid and water washing. Next, the pretreated Ti material was subjected to impregnation with and electrodeposition in the Ni—Fe alloy plating bath, to form a Ni—Fe alloy electroplating layer having a thickness of 2.0 μm on the Ti material as an electrolytic foil.

[Ni—Fe Alloy Plating Conditions]
  Bath composition
    Nickel sulfate hexahydrate: 230 g/L
    Iron sulfate heptahydrate: 20 g/L
    Nickel chloride hexahydrate: 45 g/L
    Boric acid: 30 g/L
    Trisodium citrate: 10 g/L
    Saccharin sodium: 5 g/L
    Anti-pitting agent: 1 ml/L
  Temperature: 60° C.
  pH: 2.5
  Stirring: air stirring
  Current density: 30 A/dm$^2$ Note that the Ni proportion in the Ni—Fe alloy plating was 86.9 wt %, and the Fe proportion was 13.1 wt %. Measurement of the Ni amount and Fe amount for determining the Fe proportion was performed by dissolving the Ni—Fe alloy layer of Example 1 and by ICP emission spectrophotometry (measuring device: inductively coupled plasma emission spectrophotometer ICPE-9000 made by SHIMADZU CORPORATION).

Note that the aforementioned proportion is expressed as "86.9NiFe" in Table 1 for convenience' sake. The same applies also to the following Examples.

Next, after the thus formed plating layer was sufficiently dried, the plating layer was peeled off from the Ti material, to obtain an alloy electrolytic foil.

Example 2

The same as Example 1 was carried out, except that the Ni—Fe alloy plating conditions were set as follows.
[Ni—Fe Alloy Plating Conditions]
  Bath composition
    Nickel sulfate hexahydrate: 200 g/L
    Iron sulfate heptahydrate: 50 g/L
    Nickel chloride hexahydrate: 45 g/L
    Boric acid: 30 g/L
    Trisodium citrate: 10 g/L
    Saccharin sodium: 5 g/L
    Anti-pitting agent: 1 ml/L
  Temperature: 60° C.
  pH: 2.5
  Stirring: air stirring
  Current density: 10 A/dm$^2$ Note that the Ni proportion in the Ni—Fe alloy plating was 60.8 wt %, and the Fe proportion was 39.2 wt %. Measurement of the Ni amount and Fe amount for determining the Fe proportion was conducted by dissolving the Ni—Fe alloy layer of Example 2 and by ICP emission spectrophotometry (measuring device: inductively coupled plasma emission spectrophotometer ICPE-9000 made by SHIMADZU CORPORATION).

Note that the aforementioned proportion was expressed as "60.8NiFe" in Table 1 for convenience' sake. The same applies also to the following Examples.

Example 3

The same as Example 1 was carried out, except that the thickness of the alloy electrolytic foil was 4 μm.

Example 4

The same as Example 2 was carried out, except that the thickness of the alloy electrolytic foil was 4 μm.

Example 5

The same as Example 3 was carried out, except that the value of the surface roughness Sa of the Ti material as a support on an upper surface of which the alloy electrolytic foil was to be formed was as set forth in Table 1.

Example 6

The same as Example 3 was carried out, except that the value of surface roughness Sa of a SUS316L material as a support on an upper surface of which the alloy electrolytic foil was to be formed was as set forth in Table 1.

Example 7

The same as Example 6 was carried out, except that the value of surface roughness Sa of a SUS316L material as a support on an upper surface of which the alloy electrolytic foil was to be formed was as set forth in Table 1 and that the direction of polishing of the surface of the SUS316L material was a transverse direction.

Example 8

The same as Example 1 was carried out, except that the thickness of the alloy electrolytic foil was 10 µm.

Example 9

The same as Example 2 was carried out, except that the thickness of the alloy electrolytic foil was 10 µm.

Example 10

Three plating layers of a non-lustrous Cu plating layer, a Ni—Fe alloy plating layer, and a non-lustrous Cu plating layer were sequentially formed over a support, to form a laminated electrolytic foil.

Specifically, first, a Ti material as a support prepared in the same manner as Example 1 was impregnated with the non-lustrous Cu plating bath described below, to form a non-lustrous Cu plating layer having a thickness of 1 µm on the Ti material as an electrolytic foil.

[Non-Lustrous Cu Plating Conditions]
  Bath composition: copper sulfate plating bath containing 200 g/L of copper sulfate as a main constituent
    Copper sulfate pentahydrate: 200 g/L
    Sulfuric acid: 45 g/L
  Temperature: 35° C.
  pH: equal to or less than 1
  Stirring: air stirring
  Current density: 10 A/dm$^2$ Next, the Ti material formed with the non-lustrous Cu plating layer was impregnated with the Ni—Fe alloy plating bath described below similar to that in Example 1, to form a Ni—Fe alloy plating layer having a thickness of 2 µm on the non-lustrous Cu plating layer.

Subsequently, the Ti material formed with the non-lustrous Cu plating layer and the Ni—Fe alloy plating layer was further impregnated with a non-lustrous Cu plating bath. Then, a non-lustrous Cu plating layer having a thickness of 1 µm was formed as a third metallic layer.

Next, the three plating layers formed as above were sufficiently dried, after which the plating layers were peeled off from the Ti material, to obtain a laminated metallic foil.

Example 11

The same as Example 10 was carried out, except that the Ni—Fe alloy plating conditions were the same as those in Example 2.

Example 12

The same as Example 10 was carried out, except that the thickness of the Ni—Fe alloy plating layer was 8 µm.

Example 13

The same as Example 10 was carried out, except that the thickness of the non-lustrous Cu plating layer was 3 µm and that the thickness of the Ni—Fe alloy plating layer was 4 µm.

Example 14

The same as Example 10 was carried out, except that the thickness of the non-lustrous Cu plating layer was 4 µm and that the thickness of the Ni—Fe alloy plating layer was 2 µm.

Example 15

The same as Example 11 was carried out, except that the thickness of the Ni—Fe alloy plating layer was 8 µm.

Example 16

The same as Example 11 was carried out, except that the thickness of the non-lustrous Cu plating layer was 3 µm and that the thickness of the Ni—Fe alloy plating layer was 4 µm.

Example 17

The same as Example 11 was carried out, except that the thickness of the non-lustrous Cu plating layer was 4 µm and that the thickness of the Ni—Fe alloy plating layer was 2 µm.

Example 18

Three plating layers of a non-lustrous Ni plating layer, a Ni—Fe alloy plating layer, and a non-lustrous Ni plating layer were sequentially formed on a support, to form a laminated electrolytic foil.

Specifically, first, a Ti material as a support prepared in the same manner as in Example 1 was impregnated with the non-lustrous Ni plating bath described below, to form a non-lustrous Ni plating layer having a thickness of 1 µm on the Ti material as an electrolytic foil.

[Non-Lustrous Ni Plating Conditions]
  Bath composition: Watts bath
    Nickel sulfate hexahydrate: 250 g/L
    Nickel chloride hexahydrate: 45 g/L
    Boric acid: 30 g/L
    Anti-pitting agent: 1 ml/L
  Temperature: 60° C.
  pH: 4.5
  Stirring: air stirring
  Current density: 10 A/dm$^2$ Next, the Ti material formed with the non-lustrous Ni plating layer was impregnated with the Ni—Fe alloy plating bath described in Example 1, to form a Ni—Fe alloy plating layer having a thickness of 2 µm on the non-lustrous Ni plating layer.

Subsequently, the Ti material formed with the non-lustrous Ni plating layer and the Ni—Fe alloy plating layer was further impregnated with the non-lustrous Ni plating bath. Then, a non-lustrous Ni plating layer having a thickness of 1 µm was formed as a third metallic layer.

Next, the three plating layers formed as above were sufficiently dried, after which the plating layers were peeled off from the Ti material, to obtain a laminated electrolytic foil.

Example 19

The same as Example 18 was carried out, except that the Ni—Fe alloy plating conditions were the same as those in Example 2.

Example 20

The same as Example 18 was carried out, except that the thickness of the Ni—Fe alloy plating layer was 8 µm.

Example 21

The same as Example 18 was carried out, except that the thickness of the non-lustrous Ni plating layer was 3 µm that the thickness of the Ni—Fe alloy plating layer was 4 µm.

Example 22

The same as Example 18 was carried out, except that the thickness of the non-lustrous Ni plating layer was 4 µm and that the thickness of the Ni—Fe alloy plating layer was 2 µm.

Example 23

The same as Example 19 was carried out, except that the thickness of the Ni—Fe alloy plating layer was 8 µm.

Example 24

The same as Example 19 was carried out, except that the thickness of the non-lustrous Ni plating layer was 3 µm and that the thickness of the Ni—Fe alloy plating layer was 4 µm.

Example 25

The same as Example 19 was carried out, except that the thickness of the non-lustrous Ni plating layer was 4 µm and that the thickness of the Ni—Fe alloy plating layer was 2 µm.

Example 26

An alloy electrolytic foil obtained under the same conditions as those in Example 9 was heat treated under the annealing conditions (temperature and time) indicated in Table 1A, to obtain an annealed material of the alloy electrolytic foil.

Example 27

An alloy electrolytic foil obtained under the same conditions as those in Example 9 was heat treated under the annealing conditions (temperature and time) indicated in Table 1A, to obtain an annealed material of the alloy electrolytic foil.

Example 28

The same as Example 9 was carried out, except that the current density in the Ni—Fe alloy plating was 5 A/dm$^2$.

Example 29

The same as Example 9 was carried out, except that the current density in the Ni—Fe alloy plating was 20 A/dm$^2$.

Example 30

The same as Example 9 was carried out, except that the current density in the Ni—Fe alloy plating was 30 A/dm$^2$.

Comparative Example 1

The same as Example 1 was carried out, except that the value of surface roughness Sa of the Ti material as the support on an upper surface of which the alloy electrolytic foil was to be formed was as set forth in Table 1.

Comparative Example 2

A Ti material as a support prepared in the same manner as in Example 1 was impregnated with the same non-lustrous Ni plating bath as that in Example 19, to form a non-lustrous Ni plating layer having a thickness of 4 µm on the Ti material as an electrolytic foil. After the thus formed non-lustrous Ni plating layer was sufficiently dried, the plating layer was peeled off from the Ti material, to obtain an electrolytic metallic foil.

Comparative Example 3

The same as Example 2 was carried out, except that the thickness of the non-lustrous Ni plating layer was 10 µm.

Comparative Example 4

A Ti material as a support prepared in the same manner as in Example 1 was impregnated with the same non-lustrous Cu plating bath as that in Example 11, to form a non-lustrous Cu plating layer having a thickness of 10 µm on the Ti material as an electrolytic foil. After the thus formed non-lustrous Cu plating layer was sufficiently dried, the plating layer was peeled off from the Ti material, to obtain an electrolytic metallic foil.

Comparative Example 5

An electrolytic metallic foil obtained under the same conditions as those in Comparative Example 4 was heat treated under the annealing conditions (temperature and time) indicated in Table 1A, to obtain an annealed material of the electrolytic metallic foil.

TABLE 1A

| | Material configuration | | | | | | Total thickness | Plating conditions CD [A/dm²] | | | | |
|---|---|---|---|---|---|---|---|---|---|---|---|---|
| | Metallic species | | | Target thickness [μm] | | | | | | | | |
| | ① lower layer | ② intermediate layer | ③ upper layer | ① lower layer | ② intermediate layer | ③ upper layer | (actually measured value) [μm] | ① lower layer | ② intermediate layer | ③ upper layer | Annealing conditions | Tensile strength [MPa] |
| Example 1 | — | 86.9NiFe | — | — | 2 | — | 2.5 | — | 10 | — | absent | 1108 |
| Example 2 | — | 60.8NiFe | — | — | 2 | — | 2.0 | — | 10 | — | absent | 1092 |
| Example 3 | — | 86.9NiFe | — | — | 4 | — | 4.1 | — | 10 | — | absent | 1415 |
| Example 4 | — | 60.8NiFe | — | — | 4 | — | 4.1 | — | 10 | — | absent | 1337 |
| Example 5 | — | 86.9NiFe | — | — | 4 | — | 4 | — | 10 | — | absent | 1648 |
| Example 6 | — | 86.9NiFe | — | — | 4 | — | 4.6 | — | 10 | — | absent | 1475 |
| Example 7 | — | 86.9NiFe | — | — | 4 | — | 4.6 | — | 10 | — | absent | 1326 |
| Example 8 | — | 86.9NiFe | — | — | 10 | — | 9.2 | — | 10 | — | absent | 1687 |
| Example 9 | — | 60.8NiFe | — | — | 10 | — | 9.8 | — | 10 | — | absent | 1631 |
| Example 10 | Cu | 86.9NiFe | Cu | 1 | 2 | 1 | 3.7 | 10 | 10 | 10 | absent | 972 |
| Example 11 | Cu | 60.8NiFe | Cu | 1 | 2 | 1 | 4.1 | 10 | 10 | 10 | absent | 916 |
| Example 12 | Cu | 86.9NiFe | Cu | 1 | 8 | 1 | 8.6 | 10 | 10 | 10 | absent | 1574 |
| Example 13 | Cu | 86.9NiFe | Cu | 3 | 4 | 3 | 9.8 | 10 | 10 | 10 | absent | 1043 |
| Example 14 | Cu | 86.9NiFe | Cu | 4 | 2 | 4 | 9.4 | 10 | 10 | 10 | absent | 746 |
| Example 15 | Cu | 60.8NiFe | Cu | 1 | 8 | 1 | 10 | 10 | 10 | 10 | absent | 1492 |
| Example 16 | Cu | 60.8NiFe | Cu | 3 | 4 | 3 | 10 | 10 | 10 | 10 | absent | 1019 |
| Example 17 | Cu | 60.8NiFe | Cu | 4 | 2 | 4 | 9.4 | 10 | 10 | 10 | absent | 738 |
| Example 18 | Ni | 86.9NiFe | Ni | 1 | 2 | 1 | 4.2 | 10 | 10 | 10 | absent | 1377 |
| Example 19 | Ni | 60.8NiFe | Ni | 1 | 2 | 1 | 4 | 10 | 10 | 10 | absent | 1433 |
| Example 20 | Ni | 86.9NiFe | Ni | 1 | 8 | 1 | 9.6 | 10 | 10 | 10 | absent | 1688 |
| Example 21 | Ni | 86.9NiFe | Ni | 3 | 4 | 3 | 9.8 | 10 | 10 | 10 | absent | 1406 |
| Example 22 | Ni | 86.9NiFe | Ni | 4 | 2 | 4 | 10 | 10 | 10 | 10 | absent | 1264 |
| Example 23 | Ni | 60.8NiFe | Ni | 1 | 8 | 1 | 9.3 | 10 | 10 | 10 | absent | 1678 |
| Example 24 | Ni | 60.8NiFe | Ni | 3 | 4 | 3 | 9.6 | 10 | 10 | 10 | absent | 1457 |
| Example 25 | Ni | 60.8NiFe | Ni | 4 | 2 | 4 | 9.3 | 10 | 10 | 10 | absent | 1291 |
| Example 26 | — | 60.8NiFe | — | — | 10 | — | 9.3 | — | 10 | — | 150° C. 4 h | 1701 |
| Example 27 | — | 60.8NiFe | — | — | 10 | — | 9.6 | — | 10 | — | 300° C. 4 h | 1672 |
| Example 28 | — | 60.8NiFe | — | — | 10 | — | 9.9 | — | 5 | — | absent | 1654 |
| Example 29 | — | 60.8NiFe | — | — | 10 | — | 9.7 | — | 20 | — | absent | 1653 |
| Example 30 | — | 60.8NiFe | — | — | 10 | — | 9.8 | — | 30 | — | absent | 1665 |
| Comparative Example 1 | — | 86.9NiFe | — | — | 4 | — | 4 | — | 10 | — | absent | 720 |
| Comparative Example 2 | — | Ni | — | — | 4 | — | 4 | — | 10 | — | absent | 1077 |
| Comparative Example 3 | — | Ni | — | — | 10 | — | 9.6 | — | 10 | — | absent | 1061 |
| Comparative Example 4 | — | Cu | — | — | 10 | — | 9.4 | — | 10 | — | absent | 409 |
| Comparative Example 5 | — | Cu | — | — | 10 | — | 9.9 | — | 10 | — | 150° C. 4 h | 223 |

TABLE 1B

| | Support (substrate) | | | | | | | | | |
|---|---|---|---|---|---|---|---|---|---|---|
| | Kind of plate | Sq [μm] | Sku | Sp [μm] | Sv [μm] | Sz [μm] | Sa [μm] | Sdq | Sdr [%] | Svk [μm] |
| Example 1 | Ti | 0.127 | 3.36 | 0.62 | 0.76 | 1.38 | 0.1 | 0.10 | 0.52 | 0.11 |
| Example 2 | Ti | 0.127 | 3.36 | 0.62 | 0.76 | 1.38 | 0.1 | 0.10 | 0.52 | 0.11 |
| Example 3 | Ti | 0.127 | 3.36 | 0.62 | 0.76 | 1.38 | 0.1 | 0.10 | 0.52 | 0.11 |
| Example 4 | Ti | 0.127 | 3.36 | 0.62 | 0.76 | 1.38 | 0.1 | 0.10 | 0.52 | 0.11 |
| Example 5 | Ti | 0.05 | 2.76 | 0.25 | 0.35 | 0.60 | 0.04 | 0.04 | 0.09 | 0.04 |
| Example 6 | SUS316L | 0.202 | 4.04 | 0.79 | 1.28 | 2.07 | 0.14 | 0.09 | 0.40 | 0.29 |
| Example 7 | SUS316L | 0.137 | 4.32 | 0.96 | 1.08 | 2.04 | 0.1 | 0.06 | 0.19 | 0.20 |
| Example 8 | Ti | 0.127 | 3.36 | 0.62 | 0.76 | 1.38 | 0.1 | 0.10 | 0.52 | 0.11 |
| Example 9 | Ti | 0.127 | 3.36 | 0.62 | 0.76 | 1.38 | 0.1 | 0.10 | 0.52 | 0.11 |
| Example 10 | Ti | 0.127 | 3.36 | 0.62 | 0.76 | 1.38 | 0.1 | 0.10 | 0.52 | 0.11 |
| Example 11 | Ti | 0.127 | 3.36 | 0.62 | 0.76 | 1.38 | 0.1 | 0.10 | 0.52 | 0.11 |
| Example 12 | Ti | 0.127 | 3.36 | 0.62 | 0.76 | 1.38 | 0.1 | 0.10 | 0.52 | 0.11 |
| Example 13 | Ti | 0.127 | 3.36 | 0.62 | 0.76 | 1.38 | 0.1 | 0.10 | 0.52 | 0.11 |
| Example 14 | Ti | 0.127 | 3.36 | 0.62 | 0.76 | 1.38 | 0.1 | 0.10 | 0.52 | 0.11 |
| Example 15 | Ti | 0.127 | 3.36 | 0.62 | 0.76 | 1.38 | 0.1 | 0.10 | 0.52 | 0.11 |
| Example 16 | Ti | 0.127 | 3.36 | 0.62 | 0.76 | 1.38 | 0.1 | 0.10 | 0.52 | 0.11 |
| Example 17 | Ti | 0.127 | 3.36 | 0.62 | 0.76 | 1.38 | 0.1 | 0.10 | 0.52 | 0.11 |
| Example 18 | Ti | 0.127 | 3.36 | 0.62 | 0.76 | 1.38 | 0.1 | 0.10 | 0.52 | 0.11 |
| Example 19 | Ti | 0.127 | 3.36 | 0.62 | 0.76 | 1.38 | 0.1 | 0.10 | 0.52 | 0.11 |

TABLE 1B-continued

| | Support (substrate) | | | | | | | | |
|---|---|---|---|---|---|---|---|---|---|
| | Kind of plate | Sq [μm] | Sku | Sp [μm] | Sv [μm] | Sz [μm] | Sa [μm] | Sdq | Sdr [%] | Svk [μm] |
| Example 20 | Ti | 0.127 | 3.36 | 0.62 | 0.76 | 1.38 | 0.1 | 0.10 | 0.52 | 0.11 |
| Example 21 | Ti | 0.127 | 3.36 | 0.62 | 0.76 | 1.38 | 0.1 | 0.10 | 0.52 | 0.11 |
| Example 22 | Ti | 0.127 | 3.36 | 0.62 | 0.76 | 1.38 | 0.1 | 0.10 | 0.52 | 0.11 |
| Example 23 | Ti | 0.127 | 3.36 | 0.62 | 0.76 | 1.38 | 0.1 | 0.10 | 0.52 | 0.11 |
| Example 24 | Ti | 0.127 | 3.36 | 0.62 | 0.76 | 1.38 | 0.1 | 0.10 | 0.52 | 0.11 |
| Example 25 | Ti | 0.127 | 3.36 | 0.62 | 0.76 | 1.38 | 0.1 | 0.10 | 0.52 | 0.11 |
| Example 26 | Ti | 0.127 | 3.36 | 0.62 | 0.76 | 1.38 | 0.1 | 0.10 | 0.52 | 0.11 |
| Example 27 | Ti | 0.127 | 3.36 | 0.62 | 0.76 | 1.38 | 0.1 | 0.10 | 0.52 | 0.11 |
| Example 28 | Ti | 0.127 | 3.36 | 0.62 | 0.76 | 1.38 | 0.1 | 0.10 | 0.52 | 0.11 |
| Example 29 | Ti | 0.127 | 3.36 | 0.62 | 0.76 | 1.38 | 0.1 | 0.10 | 0.52 | 0.11 |
| Example 30 | Ti | 0.127 | 3.36 | 0.62 | 0.76 | 1.38 | 0.1 | 0.10 | 0.52 | 0.11 |
| Comparative Example 1 | Ti | 0.207 | 7.57 | 2.68 | 2.51 | 5.18 | 0.15 | 0.21 | 1.93 | 0.35 |
| Comparative Example 2 | Ti | 0.127 | 3.36 | 0.62 | 0.76 | 1.38 | 0.1 | 0.10 | 0.52 | 0.11 |
| Comparative Example 3 | Ti | 0.127 | 3.36 | 0.62 | 0.76 | 1.38 | 0.1 | 0.10 | 0.52 | 0.11 |
| Comparative Example 4 | Ti | 0.127 | 3.36 | 0.62 | 0.76 | 1.38 | 0.1 | 0.10 | 0.52 | 0.11 |
| Comparative Example 5 | Ti | 0.127 | 3.36 | 0.62 | 0.76 | 1.38 | 0.1 | 0.10 | 0.52 | 0.11 |

TABLE 2

| | Substrate surface | | | | | | Electrolytic surface | | | | | |
|---|---|---|---|---|---|---|---|---|---|---|---|---|
| | Sq[μm] | Sku | Sv[μm] | Sv [μm]/total thickness [μm] | Sz[μm] | Sa[μm] | Sq[μm] | Sku | Sv[μm] | Sv [μm]/total thickness [μm] | Sz[μm] | Sa[μm] |
| Example 1 | 0.15 | 4.1 | 0.6 | 0.25 | 2.3 | 0.12 | 0.16 | 4.0 | 0.9 | 0.37 | 3.6 | 0.13 |
| Example 2 | 0.15 | 4.1 | 1.0 | 0.50 | 2.7 | 0.12 | 0.16 | 3.6 | 0.8 | 0.38 | 2.3 | 0.13 |
| Example 3 | 0.16 | 3.6 | 1.3 | 0.32 | 2.3 | 0.13 | 0.15 | 4.4 | 0.6 | 0.15 | 3.6 | 0.12 |
| Example 4 | 0.15 | 3.7 | 1.6 | 0.39 | 2.7 | 0.12 | 0.15 | 5.8 | 0.8 | 0.19 | 3.2 | 0.12 |
| Example 5 | 0.08 | 3.0 | 0.3 | 0.08 | 0.8 | 0.06 | 0.06 | 3.2 | 0.3 | 0.07 | 0.6 | 0.05 |
| Example 6 | 0.14 | 3.9 | 0.6 | 0.14 | 1.0 | 0.11 | 0.16 | 4.3 | 0.5 | 0.11 | 1.6 | 0.13 |
| Example 7 | 0.20 | 4.7 | 0.8 | 0.17 | 3.2 | 0.16 | 0.20 | 5.0 | 1.3 | 0.27 | 2.4 | 0.15 |
| Example 8 | 0.15 | 3.5 | 1.7 | 0.18 | 2.5 | 0.12 | 0.15 | 3.4 | 0.6 | 0.06 | 1.9 | 0.12 |
| Example 9 | 0.18 | 3.8 | 1.1 | 0.11 | 2.2 | 0.14 | 0.14 | 4.6 | 1.0 | 0.10 | 1.8 | 0.11 |
| Example 10 | 0.13 | 3.1 | 1.0 | 0.26 | 1.8 | 0.10 | 0.16 | 3.8 | 1.1 | 0.29 | 3.9 | 0.12 |
| Example 11 | 0.19 | 4.2 | 1.7 | 0.42 | 2.9 | 0.15 | 0.26 | 4.5 | 1.9 | 0.46 | 4.3 | 0.20 |
| Example 12 | 0.16 | 5.1 | 2.0 | 0.23 | 2.8 | 0.12 | 0.17 | 5.9 | 1.0 | 0.11 | 3.4 | 0.14 |
| Example 13 | 0.17 | 3.7 | 1.6 | 0.16 | 2.5 | 0.13 | 0.14 | 6.0 | 0.6 | 0.06 | 1.9 | 0.11 |
| Example 14 | 0.13 | 4.8 | 1.9 | 0.20 | 2.8 | 0.10 | 0.12 | 3.9 | 0.7 | 0.08 | 2.2 | 0.10 |
| Example 15 | 0.15 | 3.4 | 0.9 | 0.09 | 1.7 | 0.12 | 0.15 | 4.7 | 0.8 | 0.08 | 2.2 | 0.12 |
| Example 16 | 0.19 | 5.9 | 1.3 | 0.13 | 3.0 | 0.14 | 0.16 | 3.6 | 1.4 | 0.14 | 2.6 | 0.12 |
| Example 17 | 0.16 | 3.5 | 1.7 | 0.18 | 2.7 | 0.12 | 0.15 | 4.8 | 1.1 | 0.11 | 2.7 | 0.11 |
| Example 18 | 0.18 | 3.3 | 1.5 | 0.37 | 2.3 | 0.14 | 0.15 | 3.4 | 0.8 | 0.18 | 2.0 | 0.12 |
| Example 19 | 0.16 | 4.3 | 1.8 | 0.45 | 3.0 | 0.12 | 0.15 | 3.4 | 0.7 | 0.17 | 1.9 | 0.12 |
| Example 20 | 0.13 | 4.8 | 1.7 | 0.17 | 2.7 | 0.10 | 0.13 | 3.4 | 0.8 | 0.08 | 1.7 | 0.10 |
| Example 21 | 0.17 | 3.2 | 1.4 | 0.14 | 2.3 | 0.13 | 0.16 | 3.3 | 0.7 | 0.08 | 1.7 | 0.13 |
| Example 22 | 0.15 | 4.1 | 1.9 | 0.18 | 2.7 | 0.12 | 0.16 | 5.1 | 0.8 | 0.08 | 2.8 | 0.12 |
| Example 23 | 0.13 | 3.7 | 0.8 | 0.09 | 1.8 | 0.11 | 0.11 | 4.2 | 0.7 | 0.08 | 1.9 | 0.09 |
| Example 24 | 0.18 | 4.2 | 2.2 | 0.23 | 3.2 | 0.15 | 0.17 | 3.5 | 0.8 | 0.08 | 2.1 | 0.13 |
| Example 25 | 0.11 | 3.6 | 0.7 | 0.07 | 1.5 | 0.09 | 0.12 | 4.4 | 1.2 | 0.13 | 2.1 | 0.09 |
| Example 26 | 0.13 | 3.3 | 0.8 | 0.09 | 1.5 | 0.11 | 0.13 | 3.4 | 0.5 | 0.05 | 1.3 | 0.10 |
| Example 27 | 0.17 | 4.0 | 1.0 | 0.10 | 1.9 | 0.13 | 0.14 | 3.9 | 0.6 | 0.06 | 1.2 | 0.11 |
| Example 28 | 0.16 | 3.1 | 0.6 | 0.06 | 1.2 | 0.12 | 0.14 | 2.9 | 0.5 | 0.05 | 1.5 | 0.11 |
| Example 29 | 0.14 | 3.0 | 0.7 | 0.07 | 1.2 | 0.11 | 0.11 | 3.2 | 0.4 | 0.04 | 0.9 | 0.09 |
| Example 30 | 0.15 | 3.0 | 0.6 | 0.06 | 1.2 | 0.12 | 0.12 | 3.1 | 0.3 | 0.03 | 1.2 | 0.09 |
| Comparative Example 1 | 0.20 | 7.2 | 2.2 | 0.54 | 4.7 | 0.15 | 0.24 | 37.6 | 1.6 | 0.41 | 7.1 | 0.15 |
| Comparative Example 2 | 0.14 | 3.9 | 1.0 | 0.24 | 2.8 | 0.11 | 0.11 | 3.6 | 0.7 | 0.17 | 2.2 | 0.09 |
| Comparative Example 3 | 0.14 | 3.4 | 1.5 | 0.15 | 2.1 | 0.11 | 0.16 | 8.3 | 0.9 | 0.09 | 3.4 | 0.13 |
| Comparative Example 4 | 0.14 | 4.1 | 1.3 | 0.14 | 2.4 | 0.11 | 0.31 | 4.4 | 1.3 | 0.14 | 3.4 | 0.24 |
| Comparative Example 5 | 0.16 | 4.0 | 1.2 | 0.12 | 2.0 | 0.12 | 0.32 | 5.3 | 1.2 | 0.12 | 4.6 | 0.25 |

If has been confirmed that each of Examples has such characteristics as preferable tensile strength. On the other hand, it has been confirmed that, in Comparative Example 1, it was impossible to achieve the object from the viewpoint of tensile strength.

In addition, according to Comparative Examples 2 to 4, when compared to the results of Examples of the Ni—Fe alloy electrolytic foils of the same thicknesses, it has been confirmed that the Ni—Fe alloy electrolytic foils are preferable in regard of tensile strength.

Further, according to comparison between the results of Examples 26 and 27 and the results of Comparative Example 5, it has been confirmed that, for example, even after the heat treatment step for the purpose of drying or the like at the time of manufacturing a secondary battery, the alloy electrolytic foils of the present embodiment can maintain preferable tensile strength.

Note that the aforementioned embodiments and each of Examples can be modified variously within such ranges as not to depart from the gist of the present invention.

In addition, the alloy electrolytic foil and the laminated electrolytic foil in the aforementioned embodiments and Examples have been described as for use in mainly a battery current collector, but the use of the alloy electrolytic foil and the laminated electrolytic foil of the present invention is not limited to the current collector, and they are applicable to other uses such as a heat radiating material and an electromagnetic wave shielding material.

INDUSTRIAL APPLICABILITY

As has been described above, the laminated metallic foil, battery current collector, and battery of the present invention are applicable to a wide range of industries such as automobiles and electronic apparatuses.

REFERENCE SIGN LIST

10: Ni—Fe alloy electrolytic foil
10': Ni—Fe alloy electrolytic layer
10a: First surface
10b: Second surface
10c: First surface
10d: Second surface
20: Metallic layer
A: Laminated electrolytic foil

The invention claimed is:

1. An electrolytic foil containing a Ni—Fe alloy layer, the electrolytic foil being characterized by having a thickness of 1.5 to 10 μm, by having a first surface and a second surface, and by that a value of a maximum valley depth Sv divided by the thickness is equal to or less than 0.5 for the first surface and the second surface,
   wherein at least one metallic layer of a metallic species different from the Ni—Fe alloy layer is laminated on the Ni—Fe alloy layer, and
   wherein a proportion of the thickness of the Ni—Fe alloy layer in the electrolytic foil is 18% to 95%.

2. The electrolytic foil according to claim 1, wherein the thickness is 2.0 to 8.0 μm.

3. The electrolytic foil according to claim 1, wherein a thickness of the Ni—Fe alloy layer is 2.0 to 9.9 μm.

4. The electrolytic foil according to claim 1, wherein a total thickness of the at least one metallic layer is 0.1 to 8.0 μm.

5. The electrolytic foil according to claim 1, wherein tensile strength of the electrolytic foil exceeds 720 MPa.

6. A battery current collector comprising: the electrolytic foil according to claim 1.

* * * * *